UNITED STATES PATENT OFFICE.

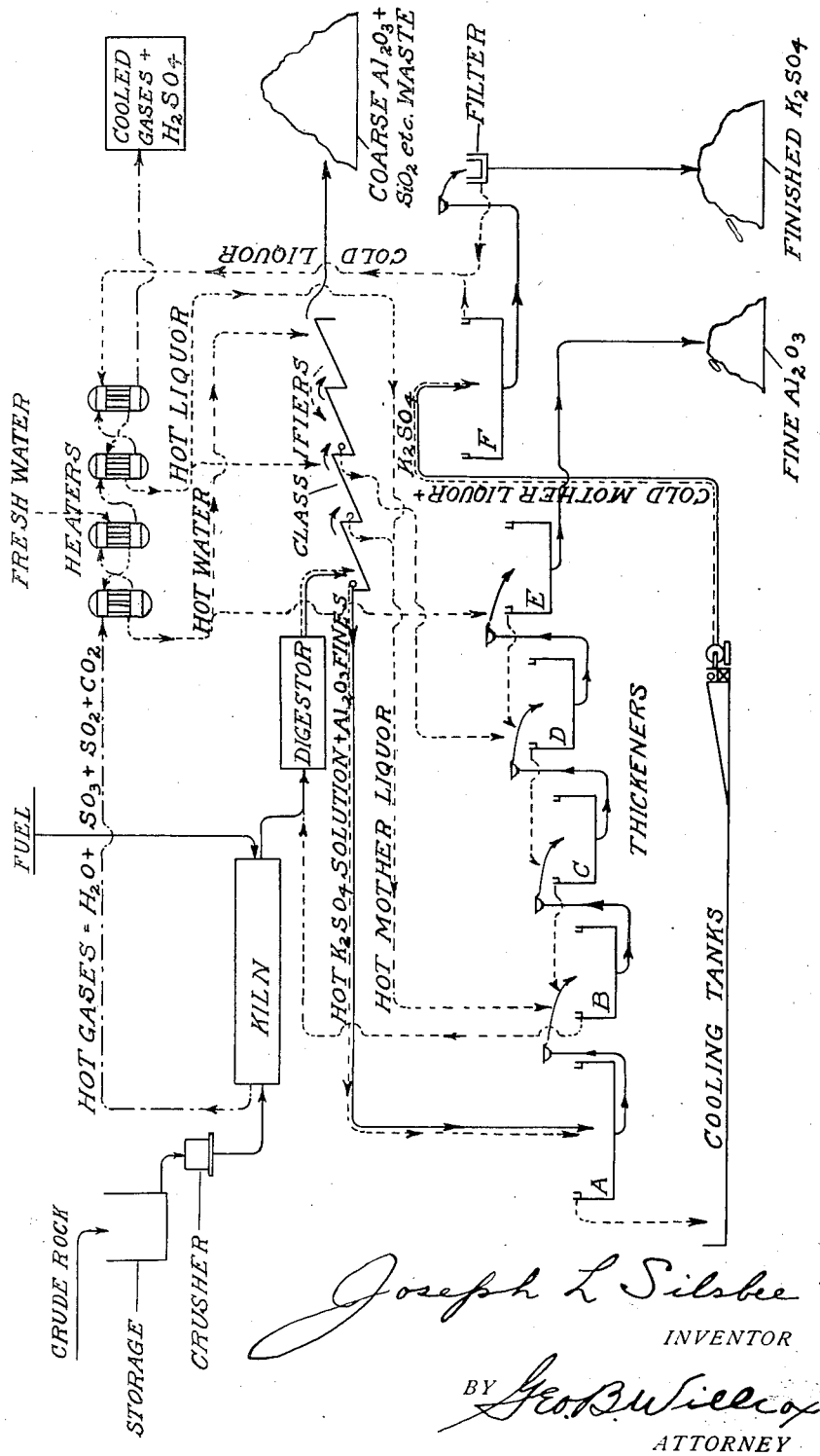

JOSEPH L. SILSBEE, OF SALT LAKE CITY, UTAH.

METHOD OF PRODUCING POTASSIUM SULFATE AND ALUMINUM OXID FROM ALUNITE OR SIMILAR MATERIAL.

1,386,031.   Specification of Letters Patent.   Patented Aug. 2, 1921.

Application filed December 2, 1919. Serial No. 341,904.

*To all whom it may concern:*

Be it known that I, JOSEPH L. SILSBEE, a citizen of the United States, residing at Salt Lake City, in the county of Salt Lake and State of Utah, have invented certain new and useful Improvements in Methods of producing Potassium Sulfate and Aluminum Oxid From Alunite or Similar Material; and I do hereby declare the following to be a full, clear, and exact description of the invention, such as will enable others skilled in the art to which it appertains to make and use the same.

This invention pertains to an improved method for the treatment of alunite or similar crude materials for the production of potassium sulfate and aluminum oxid and the objects of the invention are to conserve the heat generated in the kiln and appearing both in the gases delivered from the kiln and in the calcined ore, utilizing this heat for raising the temperature of the liquors employed as solvents, to increase their capacity for dissolving the substances to be recovered.

A further object of my invention is to render unnecessary the burning of fuel to supply latent heat of vaporization heretofore expended in concentrating the potassium sulfate liquor.

A still further object is to recirculate the solvent liquor and by properly diluting or tempering it with water while recirculating, to utilize the same liquor over and over again as a solvent for treating the calcined ore. I also utilize the liquor as a wash for purifying the crystallized material in the later stages of its manufacture, thereby attaining a high degree of purity of the finished product.

Heretofore the usual method for treatment of alunite or similar materials has consisted in roasting the raw alunite rock, either in open piles or in kilns at a temperature between seven-hundred and nine-hundred degrees centigrade. The roasted product has usually been leached with water to dissolve the potassium sulfate contents, after which the resulting liquor has been evaporated by fuel for the production of potassium sulfate.

In such a method of treatment not only is the heat of the roasted alunite wasted, but expensive evaporating equipment is also required with attendant high costs of fuel and operation.

My improved method is illustrated diagrammatically in the accompanying drawing, showing a typical flow sheet that includes the various steps of my method. In the drawing the dotted lines and arrows indicate the flow of liquor, the broken or dot-and-dash lines indicate the flow of gas, and the solid lines indicate the path of travel of the solids.

With the foregoing and certain other objects in view which will appear later in the specification, my improved method consists in first, mixing a solvent liquor with the hot calcined ore in a suitable digester as the ore comes from the kiln, thereby raising the temperature of the liquor and increasing its dissolving power while in contact with the soluble potassium sulfate of the calcined material.

From the mixture of liquor and calcined ore, aluminum oxid and silica and other coarse impurities are then removed, after which the aluminum oxid fines are removed from the hot potassium sulfate solution, washed and delivered to storage.

The clear hot potassium sulfate liquor is then cooled in suitable cooling tanks, to precipitate or crystallize out a portion of the dissolved potassium sulfate.

After removing the potassium sulfate, the residual mother liquor is used to wash the insoluble leached aluminum oxid previous to its delivery to storage.

After washing the leached aluminum oxid, the mother liquor is re-used as the solvent for dissolving the potassium sulfate from a fresh quantity of hot calcined ore.

During the recirculation of the mother liquor, I add a suitable quantity of fresh water to make up losses caused by evaporation and by moisture adhering to the discharged product, but I prefer to first use the fresh water as a final wash for the leached aluminum oxid prior to its delivery to storage and to thereby secure an aluminum oxid product of high degree of purity. By first separating the coarse aluminum oxid, silica, etc., as waste in the early steps of the method, I am enabled to remove a portion of the aluminum content of the ore as practically pure aluminum oxid, by mechanical separation.

As an additional step in the conservation of the heat generated in the calcining kiln, I employ the hot gases and vapors from the kiln to perform other functions, merely, to heat incoming fresh water before its use as a final wash for the leached aluminum oxid, thereby increasing the power of this water to dissolve potassium sulfate. The hot gases are also employed to re-heat the cold mother liquor coming from the cooling tanks before this liquor is used to wash the insoluble leached aluminum oxid, thereby increasing the capacity of the liquor for dissolving potassium sulfate.

After the gases have been so employed and have been cooled and condensed by the incoming cold fresh make-up water and by the cooled mother liquor from the crystalizing tank, sulfuric acid may be recovered from the condensed gases and vapors.

By the method herein described I not only attain the fuel economy resulting from eliminating the operation of concentrating the liquors by vaporization, but I also enable the mother liquor and the fresh make-up water to be employed as wash to purify the finished products, aluminum oxid and potassium sulfate. During the operation of separating or classifying the solids left after the initial dissolving, the hot mother liquor may be first employed to wash that coarse material, and this washing may be followed by a further washing with hot fresh water, to thoroughly remove the potassium sulfate from the coarse material. Likewise, after the initial separation of the clear potassium sulfate liquor from the aluminum oxid fines, the fines may be washed by the mother liquor from the coolers, after re-heating, or the fines may be re-washed by the hot liquor that had been used for washing the coarse material, or the fines may be washed by the hot fresh water that had been used as the final wash for the coarse material. While in some circumstances these successive washings are not absolutely essential, they are advisable for high efficiency of separation.

The various steps above enumerated will now be described, in the order in which I preferably employ them, although it will be understood that various departures may be made from the exact routine herein described, without departing from my invention, as set forth in the claims.

First step: The crude rock which when pure is of the following chemical composition: $K_2SO_4, Al_2(SO_4)3$ is first roasted in kilns preferably internally heated with powdered fuel, an even temperature of about seven-hundred to eight-hundred degrees being maintained in the kiln, as over-heating causes loss of potassium sulfate and under-heating leaves a portion of the sulfate in its original form, which is insoluble in water.

Second step: The calcined ore is introduced into any suitable form of dissolver, where it is brought into contact with the mother liquor from a later step in the process. This step is new in the art and enables me to utilize great amounts of heat of the calcined rock, which heat has heretofore been wasted. The effectiveness of dissolving may depend somewhat upon the fineness to which the original ore is crushed. In some cases it may be advisable to crush the crude ore to approximately one-inch cubes, roasting the ore and regrinding the hot material in contact with the mother liquor as in a ball mill or similar apparatus.

In some cases it may be advisable to crush the raw material to one-fourth inch size before calcining, in which event grinding in a ball mill will be unnecessary and the calcined material may be delivered direct to a suitable dissolver.

In selecting one of these methods for a particular installation, it is to be remembered that considerable disintegration or breaking down of the crude material takes place in the kiln and that the calcined material is not only always made up of smaller particles, but also that it comprises only about fifty-nine per cent. of the weight of the crude rock.

In the dissolving operation, the quantity of liquor, the temperature of the discharge and the time are important factors.

The cold mother liquor from the crystallizer, employed later as the dissolving agent, contains approximately eleven parts of potassium sulfate in solution per one hundred parts of water. This is assuming a temperature of the cold mother liquor from the crystallizer of approximately twenty-five degrees centigrade; at a lower temperature it will contain less. The hot liquor discharged from the dissolver should have a temperature of above one-hundred degrees centigrade (that is to say, a temperature as close to the boiling point as possible, at which point the maximum potassium sulfate solvent properties of the liquor are attained). At one-hundred degrees centigrade, the liquor will dissolve approximately twenty-four parts of potassium sulfate per one-hundred parts of water. In other words, the cold mother liquor, when heated to one-hundred degrees centigrade, will have the power to dissolve thirteen additional parts of potassium sulfate. It is, therefore, a simple matter, knowing the percentage of soluble potassium sulfate in the calcined hot ore, to calculate how much mother liquor to use for each ton of calcined ore. In general about three tons of twenty-five degrees centigrade liquor will be employed for each ton of calcined ore.

The time necessary in the dissolver, in order to obtain a maximum solution of potassium sulfate, depends to a large extent upon the physical character including fineness of the calcined ore, and will vary at different properties, with different ores.

Third step: The leached calcined ore and hot solution are discharged together from the dissolver into suitable classifiers or apparatus capable of separating the hot liquor from the solids.

It has been found in practice that the silica present as an impurity in the crude rock does not tend to break up or disintegrate as readily as the pure alunite, therefore, the bulk of this impurity usually remains in comparatively coarse state. Advantage may be taken of this fact to obtain a portion of the total aluminum oxid in a comparatively pure state by discharging the liquor and solids from the dissolver or digester to a steam-heated classifier, so adjusted as to remove the coarser materials while allowing the finer and purer aluminum oxid solids to remain in suspension and be discharged with the overflowing hot liquor to a thickener (A). The settled solids from the thickener yield a comparatively pure aluminum oxid, suitable for the manufacture of metallic aluminum. Approximately forty per cent. of the total aluminum oxid may be recovered in this manner, the remaining sixty per cent. (discharged from the classifier) containing practically all the silica. The silica-bearing solids may be used for the manufacture of fire brick, or for other similar purposes.

In case it is not deemed advisable to make this separation of the aluminum oxid, the hot liquor and leached ore from the digester may be discharged directly to a thickener or other suitable apparatus.

In all cases, it is necessary to maintain the temperature of the liquor in the thickener A at as near one hundred degrees centigrade as is practicable, and to have the discharge as free as possible from solids in suspension.

Fourth step: The clear hot liquor discharged from the thickener A is next transferred to a suitable cooling tank. This cooling tank is preferably equipped with a mechanical rake to continuously remove the solid potassium sulfate which crystallizes out on cooling. The size of these cooling tanks depends upon the quantity of crude material treated and the climatic conditions at the plant. As a general rule, approximately forty-eight hours cooling should be allowed, and the liquor should be reduced to the minimum temperature practicable. The yield per unit volume of the liquor cooled depends upon the difference in temperature between the incoming hot liquor and the outgoing cold liquor. Saturated liquor cooled from one-hundred degrees to twenty-five degrees centigrade will drop out approximately thirteen parts of potassium sulfate per one-hundred parts of water in solution; or roughly, one ton of sulfate per nine tons of liquor.

Fifth step: The solid crystals of potassium sulfate removed from the cooling or crystallizing tanks are transferred to a suitable filter, such as for example, a centrifugal filter, where the bulk of adhering mother liquor is removed. In a damp climate it may be advisable to send the salts discharged from the filter to a steam dryer for further drying, but in a dry atmosphere this step will be unnecessary and the discharge from the filter may be conveyed directly to a storage room or warehouse.

Sixth step: The cold mother liquor from the crystallizing tank is later heated and re-used to dissolve a fresh quantity of potassium sulfate from the hot calcined ore. But instead of sending this cold liquor directly to the hot digester, mentioned in the second step, it has been found advisable to use this liquor as a first wash for the aluminum oxid solids discharged from the classifier mentioned in the third step, and thus reduce the percentage of potassium sulfate in the liquor adhering to these solids.

In those cases where the power required for the operation of the plant is generated locally with the use of steam engines, it will be found advisable to heat this liquor as much as possible with the exhaust steam, thus effecting a saving in water by the condensation of the steam, and making the liquor more effective as a washing agent for the discharged aluminum oxid solids. This liquor will within limits, dissolve more potassium sulfate the higher the temperature and will be in condition to dissolve any solid potassium sulfate which may have been accidentally discharged with the aluminum oxid.

During the passage of the liquor through the various steps outlined above, there is naturally a certain amount of evaporation, especially from the large surface exposed to the atmosphere in the cooling tanks. In addition to this loss of water, there is a certain amount of moisture discharged with both the finished potassium sulfate and the aluminum oxid. It is necessary, therefore, to add from time to time a certain amount of make-up water to maintain the balance in the system.

Such make-up water is preferably employed, first, to wash the aluminum oxid solids discharged from the hot settler or thickener A to purify that material and also to recover the potassium sulfate contents of the adhering mother liquor. This washing may take place in a further series of settlers or thickeners as E, D, C, B.

If a separation of the pure and impure aluminum oxid is made in a classifier as described in the third step, a portion of this make-up water should first be used to wash the coarse discharge from the classifier and afterward used as a second wash, as in thickeners D, C, for the finer material that was discharged from thickener B after it had been washed in thickener B with the liquor from the cooling tanks. The remainder of the fresh water may be used as the final wash for the aluminum oxid fines in thickener E.

If no separation of the pure fine and the impure coarse aluminum oxid is made by the classifiers, as previously described, all of the fresh make-up water may be used as the final wash for discharged aluminum oxid in thickener E.

While washing the aluminum oxid I prefer to move the solids counter-current to the incoming make-up water.

After having been used for washing the out-going aluminum oxid the make-up liquor is transferred along with the mother liquor from the cooling tank to the hot digester and reused in contact with a new supply of hot roasted ore.

*Utilization of hot kiln gas and recovery of sulfuric acid.*

Where there is an available market for sulfuric acid (and in this connection it should be noted that the sulfuric acid recovered in this process is particularly high grade and free from arsenic and other impurities), the recovery of this acid from the hot kiln gas is to be recommended.

The recovery of sulfuric acid is a comparatively simple matter of cooling and condensing the gases and vapors, and where it is desirable, the cold mother liquor coming from the crystallizing tank, together with the incoming cold fresh make-up water may be used for cooling and condensing purposes.

The utilization of the cold liquor and fresh water in this manner has the additional advantage of increasing the solvent power of these liquors with respect to potassium sulfate, thus reducing to a minimum the possible losses of potassium sulfate in the discharged aluminum oxid.

In cases where the cost of power for the operation of the quarry and refinery is high, those hot gases can be first used to advantage for the generation of steam and later employed first for heating fresh water, which in this case will be utilized both for washing the product and for supplying hot water to the boilers, and secondly, for warming the cold mother liquor after it leaves the crystallizing tank and before it is again introduced into the system.

Having thus described my invention, what I claim and desire to secure by Letters Patent is:

1. The method of recovering potassium sulfate from alunitic ore, comprising crushing and roasting the ore, adding solvent liquor to the ore while hot, thereby transferring heat from the ore to the liquor and raising the temperature of said liquor to increase its capacity for dissolving potassium sulfate from the ore, mechanically separating the solvent liquor and the suspended fines of aluminum oxid from the undissolved solids of the roasted ore, separating the clear solvent liquor from the fines of aluminum oxid, cooling said liquor and depositing potassium sulfate by crystallization.

2. The method of recovering potassium sulfate from alunitic ore, comprising crushing and roasting the ore, adding solvent liquor to the hot ore, thereby transferring heat from the ore to the liquor and raising the temperature of said liquor to increase its capacity for dissolving potassium sulfate from the ore, mechanically separating the solvent liquor and the suspended fines of aluminum oxid from the undissolved solids of the roasted ore, separating the clear solvent liquor from the aluminum oxid fines, cooling said liquor and depositing potassium sulfate, separating the cooled mother liquor from the crystallined potassium sulfate, and remixing the mother liquor with a fresh quantity of hot calcined ore to dissolve potassium sulfate therefrom.

3. The method of recovering potassium sulfate from alunitic ore, comprising crushing and roasting the ore, adding solvent liquor to the ore while hot, thereby transferring heat from the ore to the liquor and raising the temperature of said liquor to increase its capacity for dissolving potassium sulfate from the ore, mechanically separating the solvent liquor and the suspended fines of aluminum oxid from the undissolved solids of the roasted ore, separating the clear solvent liquor from the fines of aluminum oxid, cooling said liquor and depositing potassium sulfate, separating the cooled mother liquor from the crystalline potassium sulfate, re-heating the mother liquor, washing the fines of aluminum oxid with the re-heated mother liquor, and re-mixing the mother liquor with a fresh quantity of calcined ore to dissolved potassium sulfate therefrom.

4. The method of recovering potassium sulfate from alunitic ore comprising crushing and roasting the ore, adding solvent liquor to the ore while hot, thereby transferring heat from the ore to the liquor and raising the temperature of said liquor to increase its capacity for dissolving potassium sulfate from the ore, mechanically separating the solvent liquor and the suspended fines of aluminum oxid from the undissolved solids of the roasted ore, separating the clear solvent liquor from the fines of aluminum oxid, cooling the solvent liquor and depositing potassium sulfate, separating the cooled mother liquor from the crystallized potassium sulfate, re-heating the mother liquor, successively washing the undissolved solids of the ore and the fines of aluminum oxid with the re-heated mother liquor, and re-mixing said mother liquor with a fresh quantity of hot calcined ore to dissolve potassium sulfate therefrom.

5. The method of recovering potassium sulfate from alunitic ore comprising crushing and roasting the ore, adding solvent liquor to the hot ore, thereby transferring heat from the ore to the liquor and raising the temperature of said liquor to increase its capacity for dissolving potassium sulfate from the ore, mechanically separating the solvent liquor and the suspended fines of aluminum oxid from the undissolved solids of the roasted ore, separating the clear solvent liquor from the fines of aluminum oxid, cooling said mother liquor and depositing crystalline potassium sulfate, re-heating the mother liquor, successively washing the undissolved solids of the ore and the fines of aluminum oxid with the re-heated mother liquor, washing the aluminum oxid fines with hot fresh water, adding the wash water to the mother liquor to make up evaporation and moisture losses, and re-mixing the mother liquor with a fresh quantity of hot calcined ore to dissolve potassium sulfate therefrom.

In testimony whereof, I affix my signature in presence of a witness.

JOSEPH L. SILSBEE.

Witness:
   WILLIAM THOMAS.